United States Patent
Kakinami et al.

(10) Patent No.: US 8,337,350 B2
(45) Date of Patent: Dec. 25, 2012

(54) POWER TRANSMISSION DEVICE AND METHOD OF ASSEMBLING THE SAME

(75) Inventors: Takuma Kakinami, Toyota (JP); Yasuo Hojo, Nagoya (JP); Masahiro Kojima, Okazaki (JP); Ryuji Ibaraki, Nishikamo-gun (JP); Atushi Tabata, Okazaki (JP); Satoru Kasuya, Hazu-cho (JP); Masashi Kito, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 614 days.

(21) Appl. No.: 12/293,917

(22) PCT Filed: Mar. 22, 2007

(86) PCT No.: PCT/JP2007/055821
§ 371 (c)(1),
(2), (4) Date: Sep. 22, 2008

(87) PCT Pub. No.: WO2007/119470
PCT Pub. Date: Oct. 25, 2007

(65) Prior Publication Data
US 2009/0227416 A1 Sep. 10, 2009

(30) Foreign Application Priority Data
Mar. 23, 2006 (JP) .................. 2006-081553

(51) Int. Cl.
*F16H 3/72* (2006.01)
(52) U.S. Cl. ........................................... 475/5
(58) Field of Classification Search .............. 475/5, 149, 475/150, 65.1
See application file for complete search history.

(56) References Cited

U.S. PATENT DOCUMENTS

| | | | | |
|---|---|---|---|---|
| 1,586,990 | A * | 6/1926 | Harrison | 464/179 |
| 2,015,430 | A * | 9/1935 | Matthews et al. | 464/179 |
| 2,466,097 | A * | 4/1949 | Graue | 403/356 |
| 6,204,577 | B1 | 3/2001 | Chottiner et al. | |
| 6,951,521 | B2 * | 10/2005 | Hakui | 475/150 |
| 7,195,575 | B2 * | 3/2007 | Kempf | 475/5 |

(Continued)

FOREIGN PATENT DOCUMENTS
JP 11 299006 10/1999
(Continued)

OTHER PUBLICATIONS

US Office Action issued Jun. 19, 2012, in U.S. Appl. No. 12/294,142, filed Sep. 23, 2009.

*Primary Examiner* — Justin Holmes
*Assistant Examiner* — David J Hlavka
(74) *Attorney, Agent, or Firm* — Oblon, Spivak, McClelland, Maier & Neustadt, L.L.P.

(57) ABSTRACT

A power transmission unit in which an inspection and tuning of an electric motor can be carried out easily. In the power transmission unit, a rotor of the electric motor is arranged between a first shaft of an input side and a second shaft of an output side, and in which the first shaft, the second shaft, and the rotor are integrally connected at least in a rotational direction. The first shaft is connected with the rotor, and the first shaft is also connected with the second shaft.

18 Claims, 4 Drawing Sheets

U.S. PATENT DOCUMENTS

| | | |
|---|---|---|
| 7,239,033 B2 * | 7/2007 | Motoike et al. ............. 290/40 C |
| 2003/0078134 A1 | 4/2003 | Kojima et al. |
| 2005/0037883 A1 | 2/2005 | Motoike et al. |
| 2006/0166778 A1 | 7/2006 | Tabata et al. |
| 2007/0131475 A1 * | 6/2007 | Matsubara .................... 180/443 |
| 2007/0213161 A1 * | 9/2007 | Tabata et al. ...................... 475/5 |
| 2007/0225098 A1 | 9/2007 | Tabata et al. |
| 2010/0069192 A1 * | 3/2010 | Tabata .............................. 475/5 |

FOREIGN PATENT DOCUMENTS

| | | |
|---|---|---|
| JP | 2000 190749 | 7/2000 |
| JP | 2002 165420 | 6/2002 |
| JP | 2003 127681 | 5/2003 |
| JP | 2003-153120 | 5/2003 |
| JP | 2003 191759 | 7/2003 |
| JP | 2004 136743 | 5/2004 |
| JP | 2005 117807 | 4/2005 |
| JP | 2005 138670 | 6/2005 |
| JP | 2005 170159 | 6/2005 |
| JP | 2006 9942 | 1/2006 |
| JP | 2006-175951 | 7/2006 |
| WO | 2006 030948 | 3/2006 |
| WO | 2006 035982 | 4/2006 |

* cited by examiner

|  | C1 | C2 | C3 | B1 | B2 | F1 |
|---|---|---|---|---|---|---|
| 1st | O |  |  |  | (O) | O |
| 2nd | O |  |  | O |  |  |
| 3rd | O | O |  |  |  |  |
| 4th | O | O |  |  |  |  |
| R |  |  | O |  | O |  |
| N |  |  |  |  |  |  |

POWER TRANSMISSION DEVICE AND METHOD OF ASSEMBLING THE SAME

TECHNICAL FIELD

This invention relates to a power transmission unit in which shafts of input and output sides are connected with a rotor of an electric motor to transmit torque among those three members, and to an assembling method of the power transmission unit.

BACKGROUND ART

In the prior art, a unit composed of a combination of an internal combustion engine with an electric motor, a unit using an electric motor as a prime mover and so on are known as a power unit of a vehicle. In order to control a drive torque and speeds of the internal combustion engine and the electric motor, a transmission is employed in a vehicle having the power unit of those kinds. One example is disclosed in Japanese Patent Laid-Open No. 2003-127681. The system disclosed in Japanese Patent Laid-Open No. 2003-127681 is a hybrid vehicle drive system in which an internal combustion engine is connected with a carrier of a planetary gear mechanism, and a first motor/generator is connected with a sun gear of the planetary gear mechanism. Also, a ring gear is connected with a member of an input side of a geared automatic transmission. A member of an output side of the automatic transmission is connected with a propeller shaft, and a second motor/generator is connected with the propeller shaft. Thus, according to the system taught by Japanese Patent Laid-Open No. 2003-127681, the planetary gear mechanism functions as a distribution mechanism distributing an engine power to the first motor/generator and to the automatic transmission. A torque is added or absorbed by a second motor/generator in the process of transmitting the power from the distribution mechanism to the automatic transmission. Japanese Patent Laid-Open No. 2003-127681 also discloses a configuration in which the second motor/generator is connected to an input side of the automatic transmission, and the output member of the automatic transmission is connected with the propeller shaft through a gear train.

According to the unit disclosed in Japanese Patent Laid-Open No. 2003-127681, the second motor/generator is connected with the propeller shaft through a gear pair, or connected with the automatic transmission. Specifically, a rotor is fixed to a rotary shaft of a predetermined gear of the gear pair, or to an input shaft of the automatic transmission. According to the unit of Japanese Patent Laid-Open No. 2003-127681, therefore, the second motor/generator is connected with the gear pair or with the automatic transmission when assembled. For this reason, in case of carrying out an inspection such as a torque measuring of the second motor/generator or carrying out some sort of adjustment before completion of assembling of an entire unit, the gear pair and the automatic transmission also have to be rotated. As a result, measurement accuracy and accuracy of adjustment of rotation angle may be deteriorated by torques of the gear pair and the automatic transmission.

DISCLOSURE OF THE INVENTION

The present invention has been conceived noting the technical problems thus far described, and its object is to provide a power distribution mechanism in which an electric motor can be rotated independently in the process of an assemble work, and to provide an assembling method thereof.

In order to achieve the above-mentioned object, according to the present invention, a rotor and a second shaft of an output side are allowed to be rotated relatively with each other prior to connecting a first shaft of an input side with the rotor, and the first shaft, the second shaft and the rotor are connected in a power transmittable manner by connecting the first shaft with the rotor and the second shaft. Specifically, according to claim 1 of the present invention, there is provided a power transmission unit, in which a rotor of a first electric motor is disposed between a first shaft of an input side and a second shaft of an output side, and in which the first shaft, the second shaft and the rotor are connected integrally at least in a rotational direction, characterized in that the first shaft is connected with the rotor, and the first shaft is also connected with the second shaft.

According to the invention, the power transmission unit further comprises: an electrical continuously variable transmission unit, in which an output shaft thereof functions as the first shaft, and in which a speed change ratio thereof is varied continuously by an electrical drive unit wherein a rotational speed thereof is controlled electrically; and a mechanical transmission unit in which a speed change ratio thereof is changed using an input shaft thereof as the second shaft.

The above-mentioned mechanical transmission unit comprises a mechanism in which a speed change ratio thereof is changed by changing a power transmission route by a mechanical means.

The above-mentioned electrical continuously variable transmission unit includes an internal combustion engine, a second electric motor, and a differential mechanism distributing power outputted from the internal combustion engine to the first shaft and to the second electric motor.

According to the power transmission unit of the invention, the rotor comprises a cylindrical portion, which is formed around a rotational center axis thereof, and which is held by a predetermined fixing portion through a bearing in a rotatable manner. At least one of the first and the second shafts is inserted into the cylindrical portion.

The power transmission unit of the invention further comprises a casing for housing the electrical continuously variable transmission unit, the first electric motor and the mechanical transmission unit, and a bulkhead functioning as the fixing portion arranged in the casing.

In addition to above, according to the power transmission unit of the invention, the first shaft is splined to the rotor, and the second shaft is splined to the first shaft.

In addition to above, according to the power transmission unit of the invention, the second shaft is inserted into an inner circumference of the cylindrical portion. The cylindrical portion comprises a diametrically small portion on its inner circumferential face. A clearance between the diametrically small portion and an outer circumferential face of the second shaft is smaller than a minimum clearance between the outer circumferential face of the rotor and the inner circumferential face of the stator. Therefore, the second shaft can be used as a guide portion for inserting the rotor.

The aforementioned diametrically small portion is formed on a portion opposed to a portion of the second shaft closer to an intermediate portion of the second shaft than a leading end of the second shaft. Here, a spline is formed on the outer circumferential face of the leading end of the second shaft. On the other hand, a spline is also formed on an end portion of the inner circumferential face of the cylindrical portion opposed to the leading end side of the second shaft.

A position of the spline formed on the leading end of the second shaft and a position of the spline formed on the cylindrical portion are substantially congruent with each other in an axial direction.

In addition to above, a portion where the first shaft and the rotor start splining and a portion where the first shaft and the second shaft start splining are different in an axial direction.

According to the power transmission unit of the invention, the second shaft penetrates the bulkhead, and the second shaft is held by the bulkhead in a rotatable manner.

The power transmission unit of the invention further comprises another fixing portion facing to the bulkhead and defining a chamber for housing the first electric motor, and according to the power transmission unit of the invention, both ends of the cylindrical portion of the rotor are held by the bulkhead and another fixing portion in a rotatable manner.

In addition to above, a spline is formed on the outer circumferential face of the first shaft to connect the first shaft and the rotor, and a spline is also formed on the inner circumferential face of the first shaft to connect the first shaft and the second shaft.

According to another aspect of the invention, there is provided an assembling method of a power transmission unit, in which a rotor of an electric motor is disposed between a first shaft of an input side and a second shaft of an output side, and in which the first shaft, the second shaft and the rotor are connected integrally at least in a rotational direction, characterized by comprising: fitting the rotor onto the second shaft in a manner to rotate relatively with each other; and thereafter connecting the first shaft with the second shaft and the rotor.

In addition to above, the power transmission unit assembling method of the invention comprises fixing a bulkhead in a casing while letting the second shaft assembled in the casing therethrough and thereby holding the second shaft in a rotatable manner; and thereafter fitting the rotor onto an outer circumferential face of the second shaft using the second shaft as a guide portion by sliding the rotor on the second shaft in an axial direction, and holding one of the end portions of the rotor by the bulkhead in a rotatable manner.

In addition to above, the power transmission unit assembling method of the invention comprises fixing another bulkhead in the casing across the rotor from the bulkhead thereby holding another end portion of the rotor in a rotatable manner.

In addition to above, the power transmission unit assembling method of the invention comprises inserting the first shaft into the rotor through said another bulkhead thereby connecting the first shaft with the rotor and the second shaft.

Thus, according to the invention, the first shaft, the second shaft and the rotor constituting the power transmission unit are connected in a torque transmittable manner, however, the second shaft and the rotor is not yet connected before inserting the first shaft. That is, the rotor is allowed to rotate around the second shaft before inserting the first shaft in the rotor so that the electric motor can be rotated independently in the process of an assembling work of the power transmission unit. Therefore, the electric motor can be inspected and tuned independently.

In addition to the above-explained advantage, according to the invention, the second shaft as an input shaft of the mechanical transmission unit and the rotor of the electric motor are not yet connected at the stage of fitting the electric motor to the input side of the mechanical transmission unit. Therefore, the electric motor can be driven independently, and an inspection and tuning of the electric motor can be carried out in the process of an assembling work of the power transmission unit.

In addition to the above-explained advantage, according to the invention, the first electric motor can be rotated independently to carry out an inspection and tuning thereof in the process of an assembling work of the power transmission unit comprising a continuously variable transmission unit capable of controlling a rotational speed of the internal combustion engine by the second electric motor.

In addition to the above-explained advantage, according to the invention, the cylindrical portion of the rotor of the first electric motor is held by the predetermined fixing portion in a rotatable manner. Therefore, the rotor can be rotated independently from the second shaft or the input shaft even if the second shaft or the input shaft is inserted into the cylindrical portion. For this reason, an inspection and tuning of the first electric motor can be carried out easily and accurately.

In addition to the above-explained advantage, according to the invention, the rotor can be held by the bulkhead which is substantially integral with the casing in a rotatable manner, and an inspection and tuning of the first electric motor can be carried out by driving the first electric motor independently before inserting the first shaft or the output shaft.

In addition to the above-explained advantage, according to the invention, the first shaft is splined individually to the rotor and to the second shaft. That is, the rotor and the second shafts can be connected with each other through the first shaft. This makes connecting work of those elements easier.

In addition to the above-explained advantage, according to the invention, the rotor can be inserted into the stator using the second shaft or the input shaft of the mechanical transmission unit as a guide portion. Therefore, the rotor can be inserted into the stator easily without contacting with the stator.

In addition to the above-explained advantage, according to the invention, the rotor can be inserted easily without contacting the cylindrical portion thereof with the spline of the second shaft.

In addition to the above-explained advantage, according to the invention, the splines are arranged collaterally in a radial direction. For this reason, torsional stress acts on the first shaft connecting the rotor and the second shaft is lightened.

In addition to the above-explained advantage, according to the invention, the first shaft is splined to one of the splines of the rotor and the second shaft at first and then splined to the other spline when the first shaft is inserted. Therefore, the insertion work of the first shaft can be carried out easily.

In addition to the above-explained advantage, according to the invention, the second shaft penetrates the bulkhead and held by the bulkhead in a rotatable manner. For this reason, the second shaft is capable of functioning sufficiently as a guide portion when inserting the rotor.

In addition to the above-explained advantage, according to the invention, both axial ends of the rotor are held in a rotatable manner. Therefore, an inspection and tuning of the first electric motor can be carried out easily before inserting the first shaft.

In addition to the above-explained advantage, according to the invention, splines formed on the inner and outer circumferential faces of the first shaft are individually splined to the rotor and to the second shaft. Therefore, a convenience in assembling those elements can be improved, and torsional stress acting on the first shaft can be lightened.

In addition to the above-explained advantage, according to the invention, the second shaft and the rotor are connected in a manner to rotate relatively with each other before inserting the first shaft therebetween. Therefore, the rotor can be rotated independently from the second shaft at this stage. For this reason, an inspection and tuning of the electric motor can be carried out easily by driving the electric motor independently. The first shaft is then inserted into the rotor to be connected with the rotor and the second shaft. As a result, torque can be transmitted between the rotor and the second shaft.

In addition to above-explained advantage, according to the invention, the rotor is inserted into the stator using the second shaft as a guide portion, therefore, the rotor can be inserted easily without being contacted with the stator and so on.

In addition to above-explained advantage, according to the invention, the rotor can be held at its both ends in a rotatable manner.

In addition to above-explained advantage, according to the invention, the first electric motor is allowed to be rotated until the first shaft is inserted, therefore, an inspection and a tuning of the first electric motor can be carried out independently. Here, the first shaft also functions as a connection member connecting the rotor and the second shaft.

BEST MODE FOR CARRYING OUT THE INVENTION

Figure 1:
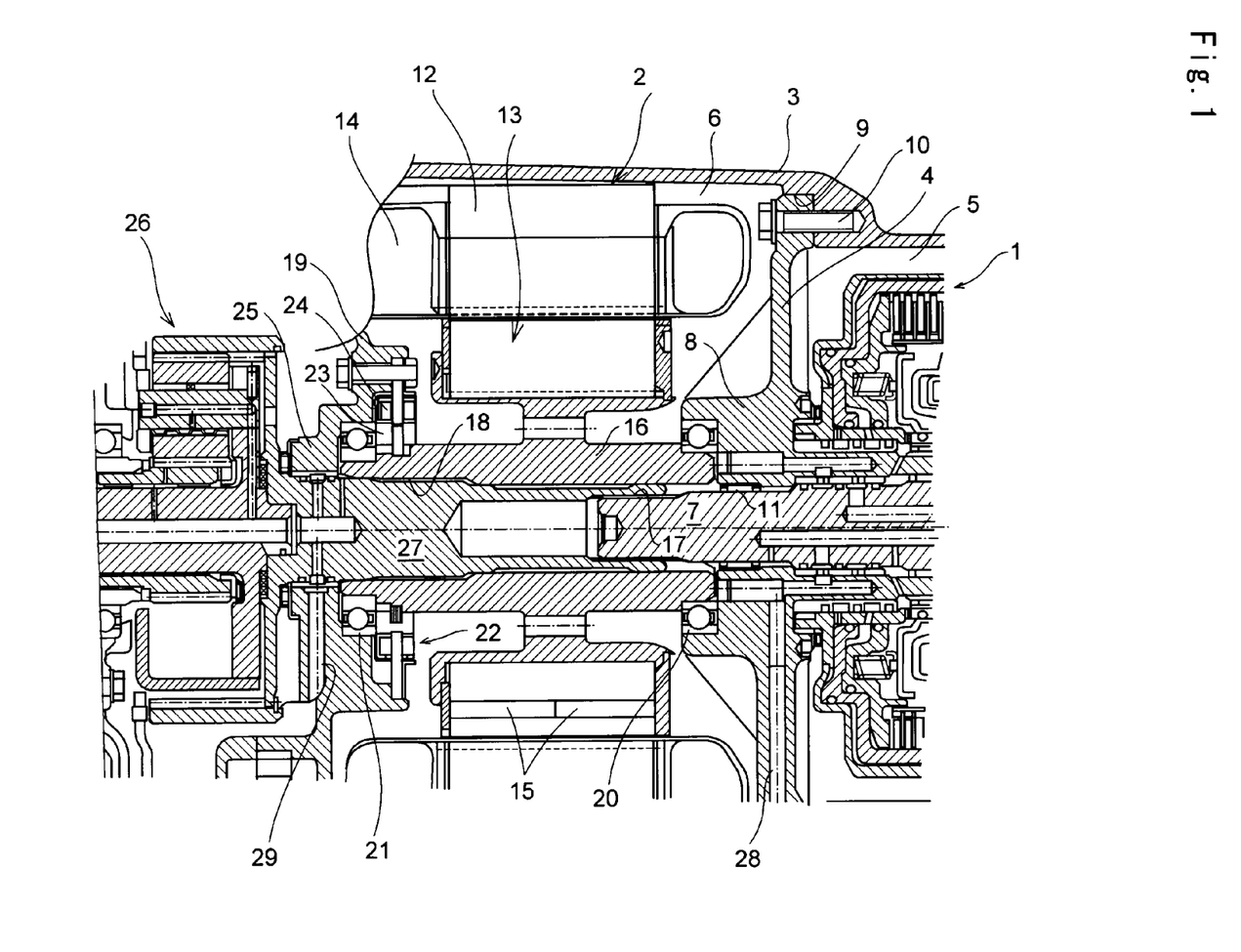
FIG. 1 is a cross-sectional view showing one example of the invention.

Next, this invention will be explained in connection with its specific example. FIG. 1 is a cross-sectional view partially showing a power transmission unit to which the invention is applied. As illustrated in FIG. 1, the power transmission unit comprises a mechanical transmission unit 1 and an electric motor 2. Those transmission unit 1 and electric motor 2 are housed in a casing 3. One of the open ends of the casing 3 (i.e., left side of FIG. 1) opens widely, and an open end of other side (i.e., right side of FIG. 1) opens narrowly to allow passage of a not shown output shaft therethrough. An internal space of the casing 3 is divided into two chambers 5 and 6 by a bulkhead 4 built inside of the casing 3. As shown in FIG. 1, the transmission unit 1 is housed in the right chamber 5, and the electric motor 2 is arranged adjacent to the bulkhead 4 in the left chamber 6.

A geared transmission mechanism, or a belt-type or toroidal type continuously variable transmission mechanism can be used as the transmission unit 1. That is, the transmission unit 1 is adapted to vary a speed change ratio by changing a power transmission route. Here will be explained an example of the geared transmission unit 1 composed mainly of a planetary gear mechanism. The transmission unit 1 comprises an input shaft 7 corresponding to a second shaft of the invention, which penetrates the bulkhead 4 to protrude toward the chamber 6 housing the electric motor 2.

The bulkhead 4 is a plate-like member comprising a boss portion 8 on its center side. The bulkhead 4 is engaged with a spigot joint portion 9 formed on an inner circumference of the casing 3 to be centered, and fixed with the casing 3 by a bolt 10. The input shaft 7 penetrates the bulkhead 4 along a center axis of the boss portion 8 of the bulkhead 4, and the input shaft 7 is held by the bulkhead 4 in a rotatable manner through a bearing 11 fitted onto an outer circumference of the input shaft 7.

On the other hand, the electric motor 2 comprises a stator (i.e., a stationary part) 12 and a rotor (i.e., a rotary part) 13 arranged in an inner circumferential side of the stator 12 and concentrically with the stator 12. An appropriate type of an electric motor, e.g., a permanent magnet synchronous motor can be used as the electric motor 2. In this case, the stator 12 is provided with a coil 14, and the rotor 13 is provided with a permanent magnet 15. The rotor 13 comprises a cylindrical portion 16 on its inner circumferential side. A length of the cylindrical portion 16 is comparable to an axial length of the coil 14. The input shaft 7 protrudes from the end portion of the rotor 13 of the bulkhead 4 side to near the intermediate portion of the cylindrical portion 16. On an outer circumferential face of a leading end of the input shaft 7, there is formed a spline 17. An inner diameter of the cylindrical portion 16 is sufficiently larger than an outer diameter of the input shaft 7, therefore, the cylindrical portion 16 and the input shaft 7 are not contacted with each other. Also, a spline 18 is formed on the inner circumferential face of the cylindrical portion 16 at its end portion opposite to the bulkhead 4 side. Here, those splines 17 and 18 are formed on different places in an axial direction.

The chamber 6 accommodating the electric motor 2 therein is defined by another bulkhead 19. Another bulkhead is fixed to the inner circumference of the casing 3 to be opposed to the bulkhead 4. The rotor 13 is held by the bulkheads 4 and 19 in a rotatable manner through bearings 20 and 21 fitted onto both ends of the cylindrical portion 16. That is, those bulkheads 4 and 19 correspond to a fixing portion of the invention. As explained above, the inner circumferential face of the cylindrical portion 16 of the rotor 13 and the outer circumferential face of the input shaft 7 are sufficiently isolated from each other, therefore, the rotor 13 still can be rotated independently when the rotor 13 is fitted onto the input shaft 7 and held by the bearings 20 and 21.

A rotor 23 of a resolver 22 is fitted onto an end portion of the cylindrical portion 16 of another bulkhead 19 side. Also, a stator 24 is arranged around an outer circumference of the rotor 23 to be opposed to the rotor 23 in the radial direction. The stator 24 is fixed to an inner face of aforementioned another bulkhead 19.

In the aforementioned another bulkhead 19, there is formed a boss portion 25 coaxially with the center axis of the input shaft 7. An output shaft 27 of a power distribution mechanism 26 corresponding to the first shaft of the invention is inserted into the boss portion 25. The output shaft 27 transmits a power from the power distribution mechanism 26 to the electric motor 2 and to the transmission unit 1. A leading end of the output shaft 27 is formed cylindrically so that the cylindrical leading end can be inserted into an inner circumferential side of the cylindrical portion 16 and fitted onto an outer circumference of the input shaft 7. A spilne is formed on an inner circumferential face of the cylindrical leading end of the output shaft 27 so that the cylindrical leading end is splined to the spline 17 of the input shaft 7. On the other hand, a spline is also formed on an outer circumferential face of the output shaft 27, at a portion to be opposed and splined to the spline 18 formed on the inner circumferential face of the cylindrical portion 16, when the output shaft 27 is inserted into the inner circumferential side of the cylindrical portion 16 as expected. That is, the output shaft 27 comprises splines on both inner and outer circumferential faces thereof. Therefore, the rotor 13 and the input shaft 7 are connected with each other in a torque transmittable manner through the output shaft 27. In other words, the rotor 13 and the input shaft 7 will not be connected until the output shaft 27 is inserted therebetween. Here, the power distribution mechanism 26 will be explained later.

Oil passages 28 and 29 are formed to penetrate the bulkheads 4 and 19. The oil passages 28 and 29 are adapted to feed lubricating oil or oil pressure to the transmission unit 1, the power distribution mechanism 26, and the bearings 11, 20 and 21, and to discharge the lubricating oil or oil pressure from those elements. In order to feed and discharge oil pressure through the oil passages 28 and 29, a (not shown) hydraulic control circuit is arranged underneath the casing 3. Also, a not shown oil pan is attached to a lower portion of the casing 3 to accommodate the hydraulic control circuit.

Figure 2:
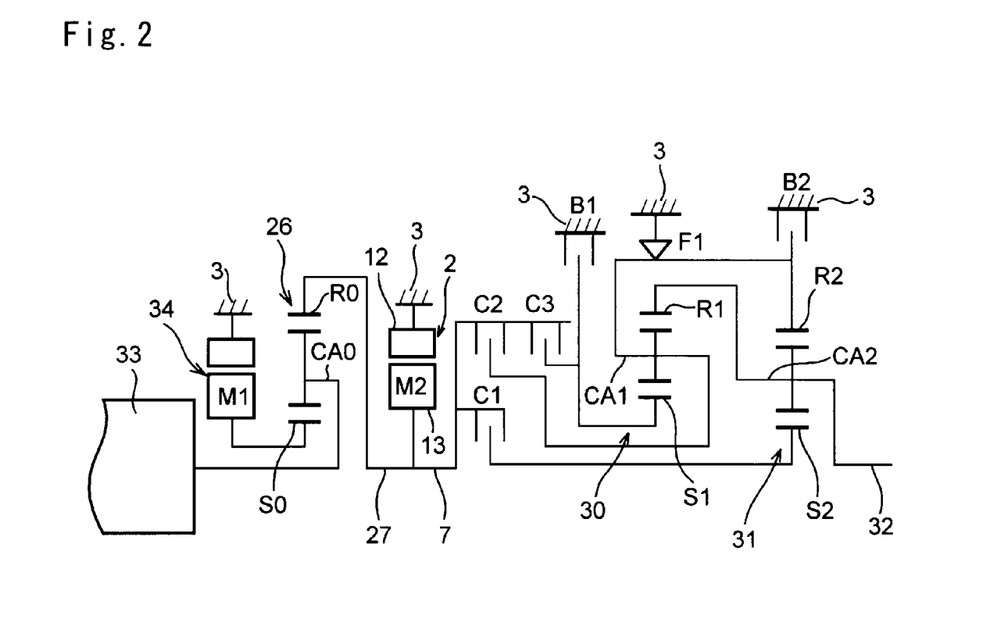
FIG. 2 is a skeleton diagram schematically showing a drive line of a hybrid vehicle comprising a power transmission unit to which the invention is applied.

The power transmission unit shown in FIG. 1 can be mounted on a hybrid vehicle, and an example thereof is illustrated in FIG. 2. FIG. 2 shows an example of so-called a "2 motors hybrid drive unit" arranged in an anteroposterior direction of the vehicle. A configuration of the transmission unit 1 is explained first of all. According to the example shown in FIG. 2, the transmission unit 1 is capable of setting four kinds of speed change ratios of forward direction and one speed change ratio of reverse direction using two sets of planetary gear mechanisms 30 and 31. The planetary gear mechanisms 30 and 31 may be single pinion type but also be double pinion type. In the example shown in FIG. 2, however, single pinion type planetary gear mechanisms are employed. Specifically, the planetary gear mechanisms 30 and 31 perform a differential action using rotary elements such as sun gears S1 and S2 as external gears, ring gears R1 and R2 as internal gears arranged concentrically around the sun gears S1 and S2, and carriers CA1 and CA2 holding pinion gears arranged between the sun gears S1 and S2 and the ring gears R1 and R2 and meshing with the sun gear and the ring gear.

The carrier CA1 of the first planetary gear mechanism 30 and the ring gear R2 of the second planetary gear mechanism 31 are connected with each other, and the ring gear R1 of the first planetary gear mechanism 30 and the carrier CA2 of the second planetary gear mechanism 31 are connected with each other. That is, the planetary gear mechanisms 30 and 31 function as a so-called "CR-CR coupled type complex planetary gear mechanism".

In order to transmit a power selectively to the complex planetary gear mechanism, there are provided three clutch mechanisms C1, C2 and C3. For example, those clutch mechanisms C1, C2 and C3 are hydraulic frictional engagement devices. The first clutch mechanism C1 is arranged between the input shaft 7 and the sun gear S2 of the second planetary gear mechanism 31. The second clutch mechanism C2 is arranged between the carrier CA1 of the first planetary gear mechanism 30 and the input shaft 7. The third clutch mechanism C3 is arranged between the sun gear S1 of the first planetary gear mechanism 30 and the input shaft 7.

In addition, there are provided a first brake mechanism B1 for selectively fixing the sun gear S1 of the first planetary gear mechanism 30, and a second brake mechanism B2 for selectively fixing the ring gear R2 of the second planetary gear mechanism 31. A hydraulic multi-disc brake or a band brake can be used as the brake mechanisms B1 and B2. Also, a one-way clutch F1 is arranged in parallel with the second brake mechanism B2. The one-way clutch F1 is adapted to be engaged to halt an integral rotation of the carrier CA1 of the first planetary gear mechanism 30 and the ring gear R2 of the second planetary gear mechanism 31 in the direction opposite to the rotational direction of the input shaft 7. Further, an output shaft 32 is connected with the carrier CA2 of the second planetary gear mechanism 31. The output shaft 32 is arranged coaxially with the aforementioned input shaft 7, and protrudes from the casing 3.

Next, here will be explained the power distribution mechanism 26. The power distribution mechanism 26 is a mechanism comprising a planetary gear mechanism, and distributing a power outputted from an internal combustion engine 33 to a motor generator (M1) 34 corresponding to a second electric motor of the invention and to the transmission unit 1. Both single and double pinion type planetary gear mechanisms capable of performing a differential action using three rotary elements may be used. In the example shown in FIG. 2, a single pinion type planetary gear mechanism is employed. The planetary gear mechanism is adapted to function as a speed increasing mechanism. Specifically, the internal combustion engine 33 is connected with a carrier CA0, the motor generator 34 is connected with a sun gear S0, and the output shaft 27 is connected with a ring gear R0.

The output shaft 27 of the power distribution mechanism 26 is also connected with the input shaft 7 of the transmission unit 1, and the rotor 13 of the aforementioned electric motor (M2) 2 is connected with those output shaft 27 and input shaft 7. Here, the motor generator 34 may also be a generator, and the electric motor 2 may also be a motor generator having a generating function. The motor generator 34 and the electric motor 2 are connected with a battery through a controller such as a (not shown) inverter. A drive torque, a generation torque, a generation amount and so on of the motor generator 34 and the electric motor 2 are controlled by controlling the inverter by an electronic control unit.

Figure 3:
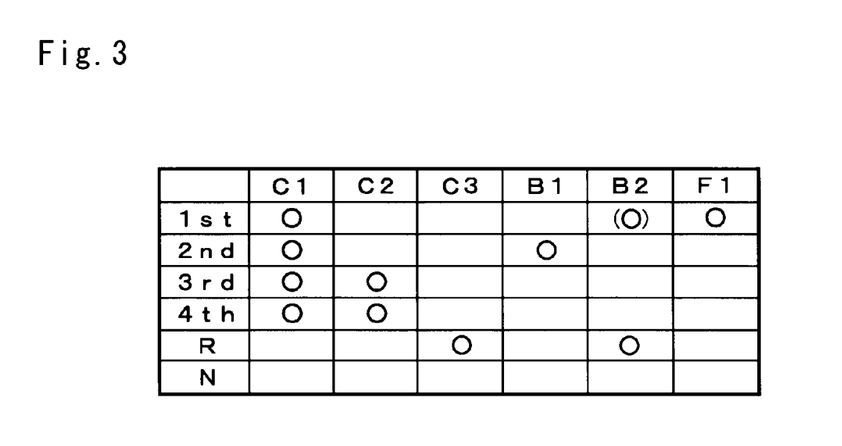
FIG. 3 is a table showing a relation between gear stages and engagement states of the mechanical transmission.

As shown in FIG. 3, the transmission unit 1 composed mainly of the aforementioned two sets of the planetary gear mechanisms 30 and 31 is capable of setting four forward stages and one reverse stage by engaging and releasing the clutch mechanisms C1, C2 and C3, the brake mechanisms B1 and B2, and one-way clutch F1. FIG. 3 is a table indicating an engagement of the aforementioned elements, i.e., clutch and brake mechanisms. Here, in FIG. 3, "◯" represents an "engagement" of the element, a blank means that the element is released, and "(◯)" represents that the element is engaged to apply power source braking (or engine braking). The clutch mechanisms C1, C2 and C3, the brake mechanisms B1 and B2 are controlled to be engaged and released by an oil pressure outputted from the hydraulic control unit.

Next, here will be explained a procedure (or method) of assembling the aforementioned power transmission unit. First of all, before fixing the bulkheads 4 and 19 to the casing 3, the components of the transmission unit 1 are inserted into the casing 3 sequentially from the wider opening (of the side where the internal combustion engine 33 is to be placed after a completion of assembling), and the inserted components are assembled in the casing 3. Then, the bulkhead 4 is engaged with the spigot joint portion 9 formed on an inner circumference of the casing 3 while inserting the input shaft 7 of the transmission 1 into the boss portion 8 of the bulkhead 4, and fixed with the casing 3 by a bolt 10. The chamber 5 housing the transmission unit 1 is thus closed, and the input shaft 7 is held by the boss portion 8 through the bearing 11 in a rotatable manner.

Figure 4:
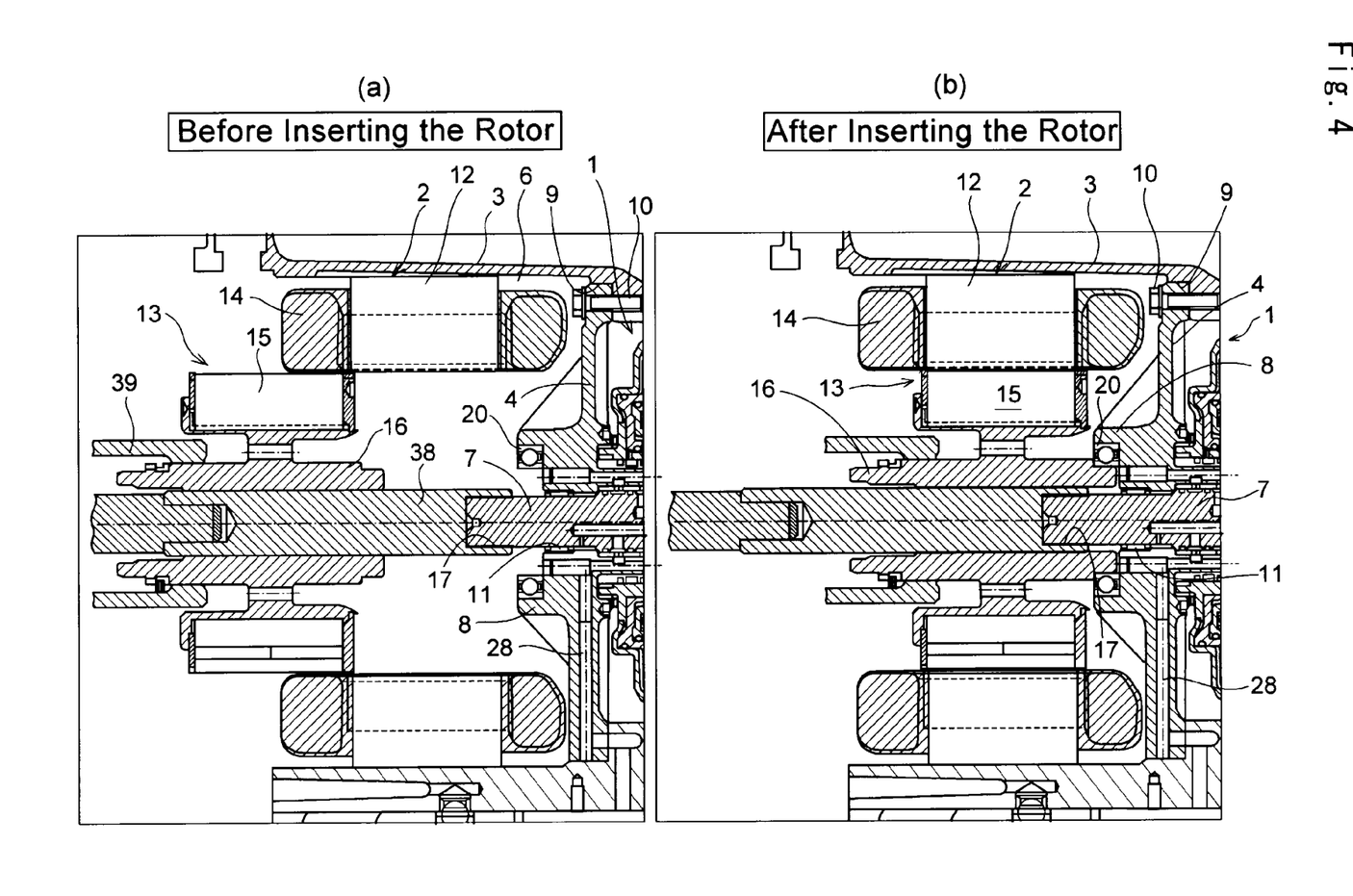
FIG. 4 is explanatory drawings partially showing a procedure of an insertion on the rotor.

After that, the stator 12 of the electric motor 2 is inserted into the inner circumference of the casing 3. In this situation, the input shaft 7 protrudes coaxially with the stator 12. As shown in FIG. 4 (a), a leading end of a guide shaft 38 is fitted onto a protruding end of the input shaft 7. An outer diameter of the guide shaft 38 is substantially comparable to that of the output shaft 27, and the guide shaft 38 is connected coaxially with the input shaft 7 which has already been placed. The rotor 13 is fitted onto an outer circumferential face of the guide shaft 38 in a slidable manner, and inserted into the inner circumferential side of the stator 12 along the guide shaft 38 using an appropriate jig 39. In this case, the bearing 20 is fitted into an inner circumferential side of the boss portion 8 of the bulkhead 4 in advance.

As shown in FIG. 4 (b), when an end portion of the rotor 13 comes close to the bulkhead 4, an end portion of the cylindrical portion of the rotor 13 is inserted into the bearing 20 attached to the bulkhead 4 and thereby held in a rotatable manner. Therefore, the rotor 13 can be kept at the same position in the axial direction with respect to the stator 12 when it is inserted into the stator 12, even if the rotor 13 has a permanent magnet 15 and magnetic force thereby acts between the rotor 13 and the stator 12. For this reason, the rotor 13 can be prevented from contacting and adhering to the stator 12.

After thus inserting the rotor 13 into the inner circumference of the stator 12, another bulkhead 19 is inserted into the casing 3 and fixed to the inner circumferential face of the casing 3. In this case, the rotor 23 of the resolver 22 is fitted onto the cylindrical portion 16, and the stator 24 of the resolver 22 is fixed to the inner face of another bulkhead 19 in advance. Also, the bearing 21 is fitted onto the outer circumferential face of other end of the cylindrical portion 16 or fitted into an inner circumferential portion of another bulkhead 19 in advance. Therefore, the other end of the cylindrical portion 16 is held by the aforementioned another bulkhead 19 through the bearing 21 in a rotatable manner. That is, the rotor 13 is held by the bulkheads 4 and 19 through the bearings 20 and 21 in a rotatable manner. In this situation, the rotor 13 and the input shaft 7 are not yet connected with each other and the rotor 13 is allowed to rotate around the input shaft 7. That is, it is possible to rotate the rotor 13 independently. For this reason, the electric motor can be driven separately from the transmission unit 1 to be examined, and a tuning of the resolver 22 can also be carried out.

Then, the output shaft 27 of the power distribution mechanism 26 assembled in advance is inserted into the inner circumferential side of the cylindrical portion 16 through the aforementioned another bulkhead 19. As explained above, the leading end of the output shaft 27 is formed into a cylindrical shaft, and a spline is formed on the inner circumferential face thereof. Therefore, when the spline is splined to the spline 17 of the input shaft 7, the output shaft 27 is connected with the input shaft 7 in a torque transmittable manner. At the same time, the spline formed on the outer circumferential face of a base end side (i.e., left side of FIG. 1) of the output shaft 27 is splined to the spline 18 formed on the inner circumferential face of the cylindrical portion 16, so that the output shaft 27 is connected with the rotor 13 in a torque transmittable manner. As a result, the output shaft 27, the input shaft 7 and the rotor 13 are connected in a torque transmittable manner.

Thus, according to the invention shown in FIG. 1, the rotor 13 and the input shaft 7 are not yet connected with each other at the stage of inserting the rotor 13 into the inner circumference of the stator 12. Therefore, the electric motor 2 can be rotated independently to be examined and tuned. For this reason, an inspection and tuning of the electric motor 2 can be carried out easily and an accuracy of the inspection and tuning can be improved.

Figure 5:
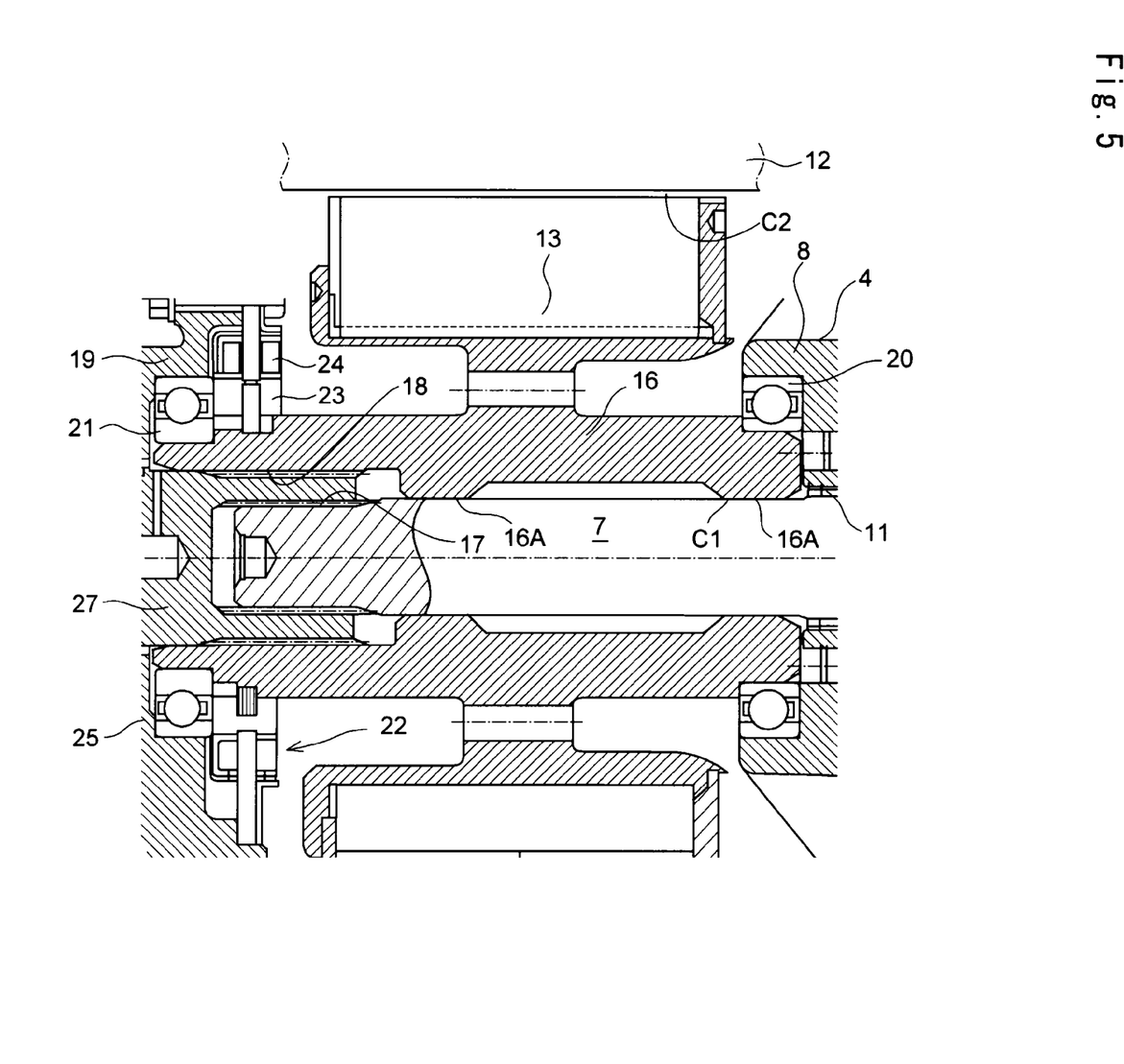
FIG. 5 is a cross-sectional view showing another example of the invention.

Next, here will be explained another example of the present invention. FIG. 5 shows an example, in which a protruding length of the input shaft 7 is elongated, and the output shaft 27 is splined to the input shaft 7 and to the rotor 13 at same positions in the axial direction. Specifically, the input shaft 7 extends to near the end portion of the cylindrical portion 16 of another bulkhead 19 side, and the spline 17 is formed on the outer circumferential face of the input shaft 7 at a position substantially opposed to the spline 18 formed on the inner circumferential face of the cylindrical portion 16 (i.e., at a position substantially same as the spline 18 in the axial direction). Here, as shown in FIG. 5, a left end portion of the spline 17 of the input shaft 7 is separated from a left end portion of the spline 18 of the cylindrical portion 16 in the axial direction. In other words, a position where the output shaft 27 starts to be splined to the spline 18 and a position where the output shaft 27 starts to be splined to the spline 17 are isolated in the axial direction. That is, the output shaft 27 is splined to one of the cylindrical portion 16 and the input shaft 7 first of all and then splined to the other one. For this reason, an insertion of the output shaft 27 can be facilitated.

In accordance with the length of the input shaft 7, a length of the output shaft 27 is shortened in comparison with that in the above-explained example, and a leading end of the output shaft 27 is situated between the spline 18 of the cylindrical portion 16 and the spline 17 of the input shaft 7. A spline is formed on both inner and outer circumferential faces of the cylindrical leading end of the output shaft 27 so that the leading end of the output shaft 27 is splined to the cylindrical portion 16 and to the input shaft 7.

The cylindrical portion 16 comprises two diametrically smaller portions 16A on its inner circumferential face, at portions closer to an end portion opposite to the spline 18 side and at a predetermined interval. The diametrically smaller portions 16A is used when fitting cylindrical portion 16 on the input shaft 7 as a guide member to insert the rotor 13 into the stator 12. Here, a clearance C1 between an inner circumferential face of the diametrically smaller portion 16A and the outer circumferential face of the input shaft 7 is smaller than a minimum clearance C2 between the outer circumferential face of the rotor 13 and the inner circumferential face of the stator 12. That is, in case the rotor 13 is radially misaligned when inserted into the stator 12, the diametrically smaller portion 16A is contacted to the input shaft 7 so that a position of the rotor 13 in a radial direction is regulated. Therefore, the rotor 13 will not contact to or conflict with the stator 12. The remaining construction is similar to that shown in FIG. 1, so further description will be omitted by allotting common reference numerals to FIG. 5.

Thus, according to the configuration shown in FIG. 5, the rotor 13 and the input shaft 7 are not yet connected with each other even when the transmission unit 1 and the electric motor 2 are assembled. Therefore, the electric motor 2 and the transmission unit 1 are still disconnected from each other and allowed to be driven independently even at this stage. For this reason, an inspection of the electric motor 2 and the transmission unit 1, as well as a tuning of the resolver 22 can be carried out by driving the electric motor 2 and the transmission unit 1 independently. According to the example shown in FIG. 5, moreover, the input shaft 7 extends almost the entire length of the stator 7. Therefore, the rotor 13 can be inserted into the stator 12 by fitting the cylindrical portion 16 of the rotor 13 onto the input shaft 7 and using the input shaft 7 as a guide member. Thus, an insertion of the rotor 13 can be facilitated. Furthermore, the splines are formed on the inner and outer circumferential faces of the output shaft 27 at substantially same position in the axial direction. Therefore, torsional stress acting on the output shaft 27 can be minimized.

Here, in the example thus far explained, the present invention is applied to the power transmission unit of a hybrid drive unit. However, the present invention should not be limited to the aforementioned example. This means that the present invention may also be applied to other kinds of power transmission units such as a power transmission unit in an electric vehicle. On the other hand, the transmission unit used in the present invention should not be limited to the aforementioned planetary gear type geared transmission mechanism but a transmission mechanism without speed changing function may also be used. Further, according to the invention, the electric motor should not be limited to the permanent magnetic type electric motor but other kinds of appropriate electric motor may also be used. Additionally, the mechanism for transmitting torque should not be limited to the spline but may also be an engaging means for integrating members in a rotational direction such as a serration and a slide key.

The invention claimed is:

1. A power transmission unit, comprising:
   a rotor of a first electric motor, which has a cylindrical portion, is formed around a rotational center axis thereof, and which is held rotatably by bearings arranged at both axial ends of the cylindrical portion and individually interposed between an outer face of the cylindrical portion and predetermined fixing portions;
   a first shaft splined with the cylindrical portion; and
   a second shaft inserted into and not contacted to the cylindrical portion and splined to the first shaft, wherein
   the rotor rotates independently of the second shaft when the first shaft is disengaged from the rotor and the second shaft, and
   the rotor rotates integrally with the second shaft when the first shaft is engaged with the rotor and the second shaft.

2. The power transmission unit as claimed in claim 1, further comprising:
   an electrical continuously variable transmission unit, wherein an output shaft of the electrical continuously variable transmission unit functions as the first shaft, and a speed change ratio of the electrical continuously variable transmission unit is varied continuously by an electrical drive unit, wherein a rotational speed thereof is controlled electrically; and
   a mechanical transmission unit, wherein a speed change ratio thereof is changed using an input shaft thereof as the second shaft.

3. The power transmission unit as claimed in claim 2, wherein:
   the mechanical transmission unit comprises a mechanism that changes a speed change ratio thereof by changing a power transmission route by a mechanical unit.

4. The power transmission unit as claimed in claim 2, wherein:
   the electrical continuously variable transmission unit includes an internal combustion engine, a second electric motor, and a differential mechanism distributing power outputted from the internal combustion engine to the first shaft and to the second electric motor.

5. The power transmission unit as claimed in claim 1, further comprising:
   a casing for housing the electrical continuously variable transmission unit, the first electric motor and the mechanical transmission unit; and
   a bulkhead functioning as the fixing portion arranged in the casing.

6. The power transmission unit as claimed in claim 1, wherein:
   the cylindrical portion comprises a diametrically small portion on its inner circumferential face; and
   a clearance between the diametrically small portion and an outer circumferential face of the second shaft is smaller than a minimum clearance between the outer circumferential face of the rotor and the inner circumferential face of the stator,
   wherein the second shaft is a guide portion for insertion of the rotor.

7. The power transmission unit as claimed in claim 6, wherein:
   the diametrically small portion is disposed on a portion opposed to a portion of the second shaft closer to an intermediate portion of the second shaft than a leading end of the second shaft;
   a first spline is disposed on the outer circumferential face of the leading end of the second shaft; and
   a second spline is disposed on an end portion of the inner circumferential face of the cylindrical portion opposed to the leading end side of the second shaft.

8. The power transmission unit as claimed in claim 7, wherein:
   a position of the first spline formed on the leading end of the second shaft and a position of the second spline formed on the cylindrical portion are opposite each other.

9. The power transmission unit as claimed in claim 1, wherein:
   a portion where the first shaft and the cylindrical portion start splining and a portion where the first shaft and the second shaft start splining are different in the axial direction.

10. The power transmission unit as claimed in claim 5, wherein:
    the second shaft penetrates the bulkhead, and
    the second shaft is held by the bulkhead in a rotatable manner.

11. The power transmission unit as claimed in claim 5, further comprising:
    another fixing portion facing to the bulkhead and defining a chamber for housing the first electric motor,
    wherein both ends of the cylindrical portion of the rotor are held by the bulkhead and said another fixing portion in a rotatable manner.

12. The power transmission unit as claimed in claim 1, wherein:
    a first spline is formed on the outer circumferential face of the first shaft to connect the first shaft and the cylindrical portion; and
    a second spline is formed on the inner circumferential face of the first shaft to connect the first shaft and the second shaft.

13. An assembling method of a power transmission unit including a rotor of an electric motor disposed between a first shaft of an input side and a second shaft of an output side, and the first shaft, the second shaft and the rotor are connected integrally at least in a rotational direction, comprising:
    fitting the rotor onto the second shaft, wherein the rotor and second shaft rotate independently of each other; and
    thereafter connecting the first shaft with the second shaft and the rotor.

14. The assembling method of a power transmission unit as claimed in claim 13, further comprising:
    fixing a bulkhead in a casing while letting the second shaft assembled in the casing therethrough, wherein the bulkhead holds the second shaft in a rotatable manner; and
    thereafter fitting the rotor onto an outer circumferential face of the second shaft using the second shaft as a guide portion by sliding the rotor on the second shaft in an axial direction, and holding one of the end portions of the rotor by the bulkhead in a rotatable manner.

15. The assembling method of a power transmission unit as claimed in claim 14, further comprising:

fixing another bulkhead in the casing across the rotor from the bulkhead, wherein the another bulkhead holds another end portion of the rotor in a rotatable manner.

16. The assembling method of a power transmission unit as claimed in claim 15, further comprising:

inserting the first shaft into the rotor through said another bulkhead and connecting the first shaft with the rotor and the second shaft.

17. The assembling method of a power transmission unit as claimed in claim 13, wherein the connecting includes using a first spline on an outer circumferential face of the first shaft to connect the first shaft and the rotor and using a second spline on an inner circumferential face of the first shaft to connect the first shaft and the second shaft.

18. The power transmission unit of claim 1, wherein the rotor is rotatable around the second shaft when the first shaft is disengaged from the rotor and the second shaft.

* * * * *

UNITED STATES PATENT AND TRADEMARK OFFICE
CERTIFICATE OF CORRECTION

PATENT NO. : 8,337,350 B2  
APPLICATION NO. : 12/293917  
DATED : December 25, 2012  
INVENTOR(S) : Takuma Kakinami et al.

Page 1 of 1

It is certified that error appears in the above-identified patent and that said Letters Patent is hereby corrected as shown below:

On the title page, Item (75), the 5th inventor's name is incorrect, Item (75) should read:

--(75) Inventors: Takuma Kakinami, Toyota (JP); Yasuo Hojo, Nagoya (JP); Masahiro Kojima, Okazaki (JP); Ryuji Ibaraki, Nishikamo-gun (JP); Atsushi Tabata, Okazaki (JP); Satoru Kasuya, Hazu-cho (JP); Masashi Kito, Anjo (JP)--

Signed and Sealed this  
Twenty-sixth Day of March, 2013

Teresa Stanek Rea  
*Acting Director of the United States Patent and Trademark Office*